United States Patent
Lares et al.

(10) Patent No.: US 6,271,888 B1
(45) Date of Patent: Aug. 7, 2001

(54) METHOD FOR OBTAINING LINE SYNCHRONIZATION INFORMATION ITEMS FROM A VIDEO SIGNAL, AND APPARATUS FOR CARRYING OUT THE METHOD

(75) Inventors: Roland Lares, Ulm; Albrecht Rothermel, Neu-Ulm, both of (DE)

(73) Assignee: Deutschethomson-Brandt GmbH (DE)

( * ) Notice: Subject to any disclaimer, the term of this patent is extended or adjusted under 35 U.S.C. 154(b) by 0 days.

(21) Appl. No.: 09/136,264

(22) Filed: Aug. 19, 1998

(30) Foreign Application Priority Data

Aug. 27, 1997 (DE) ............................................. 197 37 326

(51) Int. Cl.⁷ ........................... H04N 5/06; H04N 5/08
(52) U.S. Cl. ......................... 348/521; 348/500; 348/525; 348/531; 348/533
(58) Field of Search ................................. 348/521, 525, 348/500, 530, 531, 533, 538, 540, 610, 614, 607, 629, 21, 845.3; 386/24; 382/279; 375/365, 366, 368; H04N 5/06, 5/08

(56) References Cited

U.S. PATENT DOCUMENTS

| | | | |
|---|---|---|---|
| 4,220,967 | * 9/1980 | Ichida et al. | 358/105 |
| 4,743,969 | 5/1988 | Habeck et al. | 348/525 |
| 4,962,419 | * 10/1990 | Hibbard et al. | 358/37 |
| 4,970,593 | * 11/1990 | Cantrell | 358/166 |
| 5,119,193 | * 6/1992 | Noji | 358/166 |
| 5,274,452 | * 12/1993 | Kawamoto | 358/153 |
| 5,576,770 | * 11/1996 | Rumreich | 348/525 |
| 5,610,667 | * 3/1997 | Hush | 348/531 |
| 5,760,839 | * 6/1998 | Sumiyoshi | 348/541 |
| 5,844,622 | * 12/1998 | Hulvey | 348/531 |
| 5,986,635 | * 11/1999 | Naka et al. | 345/127 |
| 5,995,157 | * 11/1999 | Retter et al. | 348/525 |

FOREIGN PATENT DOCUMENTS

| | | | |
|---|---|---|---|
| 35 06 449 C1 | 6/1986 | (DE) | H03K/5/22 |
| 0 220 007 A2 | 4/1987 | (EP) | H04N/9/87 |
| 96/26604 A2 | 8/1996 | (WO) | H04N/5/956 |

OTHER PUBLICATIONS

German Search Report for counterpart German application No. 19737326.7, filed on Aug. 27, 1997.

* cited by examiner

Primary Examiner—Reinhard J. Eisenzopf
Assistant Examiner—Jean W. Désir
(74) Attorney, Agent, or Firm—Joseph S. Tripoli; Daniel E. Sragow

(57) ABSTRACT

A method for obtaining line synchronization information items from a video signal is proposed. To that end, the following improvement measures are proposed:

a) an accurate determination of the position of a line synchronization pulse is effected by carrying out a convolution operation between the video signal for the video line and a pattern function. The exact position is then established by analysis of the result function ($\phi_{sv}(k)$) of the convolution operation.

B) time-domain filtering of the established positions of the line synchronization pulses is carried out, in which a linear or non-linear estimation for the purpose of determining the corrected positions of the line synchronization pulses is carried out in each case.

The invention also relates to an apparatus for carrying out the method.

13 Claims, 7 Drawing Sheets

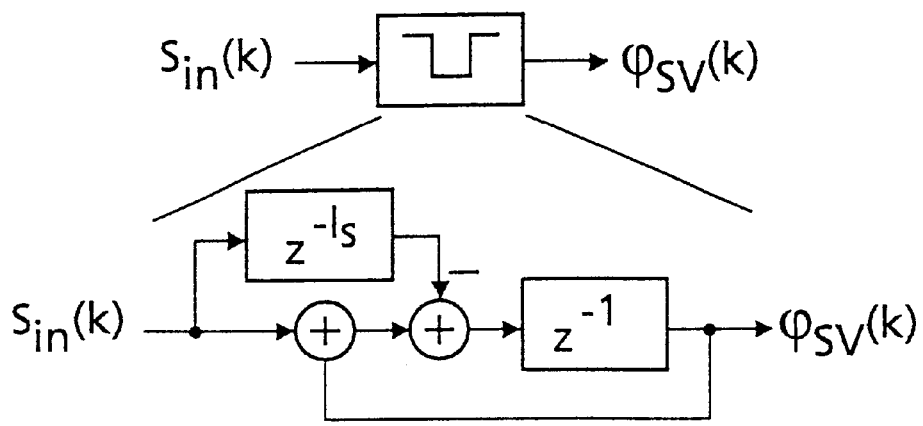
Fig.3
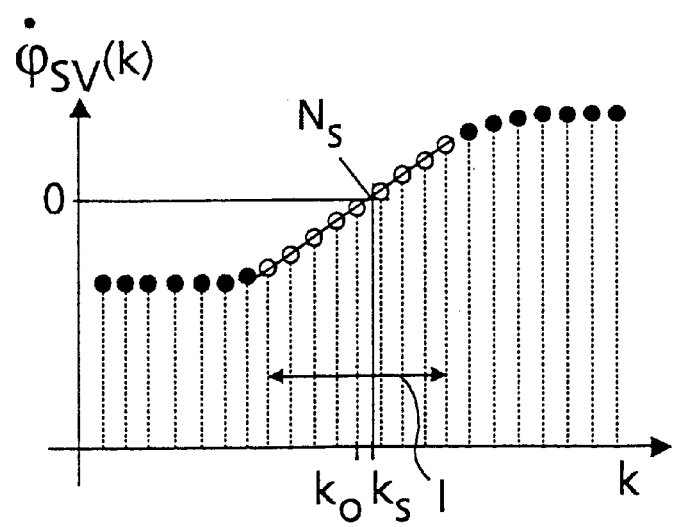
Fig.4
Fig.5 a)

b)

c)

METHOD FOR OBTAINING LINE SYNCHRONIZATION INFORMATION ITEMS FROM A VIDEO SIGNAL, AND APPARATUS FOR CARRYING OUT THE METHOD

BACKGROUND OF INVENTION

The invention relates to a method for obtaining line synchronization information items from a video signal, and also to an apparatus for carrying out the method.

The invention is based on a method for obtaining line synchronization information items from a video signal of the generic type of the independent claim 1. Even though digital system solutions will become increasingly predominant in future television technology, analogue source signals will still exist for many years in the future. Examples include the terrestrial reception of video signals, which is still widespread to date, and the analogue recording methods, e.g. according to the VHS standard in the case of video recorders. Such, analogue signal sources represent critical signal sources for digital systems, and their signal processing requires special measures.

To date, television receivers with digital signal processing (e.g. in the case of the 100 Hz technology) have been operating, as a rule, with clock systems which are synchronized with the respective input signal. Since the input signal is the analogue CVBS signal, either the horizontal sync pulse (line-locked clock) or, alternatively, the colour subcarriers or colour synchronizing pulses (burst) (colour subcarrier-locked clock) are frequently used as reference point for the synchronization. The sync separation in the video lines has usually been carried out to date by means of analogue methods using so-called sync separator stages and a PLL filter stage connected downstream. In television receivers with digital signal processing, a PLL filter stage which is a digital realization of the known analogue sync signal processing is usually used. The filter stage is then a digital PLL (Phase-Locked Loop). Examples of such digital PLL circuits are the circuits SAA 7111 from Philips, HMP 8112 from Harris and Digit 3000 from Intermetall. The principal problem with such digital PLL circuits is that the known instabilities in the picture occur when the input signal present is an analogue video signal picked off from an analogue video recorder which is currently operating in the search mode (fast forward or reverse run). Many users of analogue video recorders are sufficiently acquainted with such instabilities. Specifically, disturbing horizontal stripes appear in the picture when the video recorder is operating in the search mode. These disturbing stripes originate from the fact that in the search mode, the video heads no longer run on a single slanted track but rather sweep across two or more slanted tracks, depending on the search speed. During the transition from one slanted track to the next, abrupt sudden phase changes arise with regard to the occurrence of the sync pulses of the video lines. These sudden phase changes are actually governed by the geometry in magnetic tape recording in accordance with the slanted track method. The sudden phase changes are therefore determined by the system and, in addition, virtually unavoidable.

Irregular occurrence of line sync pulses also arises, however, in the case of video signals generated by camcorders. In this case, the instabilities that occur are, as a rule, more severe than in the case of a normal video recorder, because the regulation of the head-drum speed is subject to greater fluctuations on account of the larger component tolerances.

EP-A 0 266 147 discloses a digital PLL circuit for a television receiver. In the case of this digital PLL circuit, in order to avoid the abovementioned problem in the search operating mode in video recorders, a switching unit is provided which drastically shortens the time constant of the phase-locked loop in the event of identification of a sudden phase change caused by the head changeover at the end of a slanted track, with the result that the region of instability in the picture is reduced in size. The disadvantage of this solution is that the reduction of the time constant of the phase-locked loop provided by this solution means that noise components in the video signal are able to be suppressed less well and disturbing lines still remain visible, even though to a lesser extent than when the time constant is larger.

SUMMARY OF THE INVENTION

Taking the abovementioned prior art as a departure point, the object of the invention is to specify a method for obtaining line synchronization information items which enables a further improvement in the picture quality even in the case of noise and unstable analogue source signals, and at the same time can be realized in a simple manner in terms of circuitry, in particular with digital technology.

The object is achieved separately in each case by a plurality of steps but combining the various measures affords an optimized solution. The first improvement measure consists in accurately determining the position of a line sync pulse that occurs. This is done differently from the previously known methods, in which frequently it is simply a case of evaluation only of the falling or rising edge of the line sync pulse, in that the respective video line or only part of the video line is convolved with a pattern function and the position determination for the line sync pulse is carried out by analysis of the result function of the convolution operation. An ideal line synchronization pulse is preferably used as the pattern function. An improvement in the position determination is advantageous particularly in the case of terrestrially transmitting video signals with multipath propagation which are subjected to a great deal of interference.

The other, very essential improvement measure according to claim 1 consists in replacing the digital PLL circuit that is usually used otherwise by a filter unit in which filtering of the positions of the line sync pulses in the temporal direction takes place, in which a linear or non-linear estimation is carried out for the respective position to be corrected of a line sync pulse. Thus, a feedback control loop is no longer used and the known settling problems of these control loops are deliberately avoided. As a result, it is possible to achieve a significant improvement in the picture quality for critical source signals. Therefore, particularly in the case of signals from video recorders, in the case of noisy antenna signals or else antenna signals in surroundings where interference due to multipath propagation occurs, it is possible to improve the picture quality of the video signals displayed. Since the new approach additionally implies a free-running, crystal-generated system clock, the solution is excellently suited to digital video signal processing in computer systems.

Further improvements to the method are possible by virtue of the measures evinced in the dependent claims. As already mentioned, an ideal line sync pulse is preferably selected as the pattern function for the convolution operation. This pulse has a slightly trapezoidal shape.

The analysis of the result function of the convolution operation preferably comprises determination of the maximum or minimum of the result function. These operations can easily be carried out mathematically by various methods. The position of the maximum or minimum then specifies the position of the line sync pulse (the centre of the line sync pulse). It is thus possible to perform an unambiguous position determination in a simple manner. The measure is based on the insight that the convolution result of two square-wave pulses is a triangle function having an absolute maximum or minimum.

It is advantageous if, in order to determine the maximum or minimum of the result function in the convolution operation, the first derivative in the result function is formed and then the zero of the first derivative is determined. A triangle function exhibits only one zero in the first derivative, which can easily be determined by customary computation methods.

Since the signals involved are signals which are limited in terms of their bandwidth and are processed digitally, the peak of the result function of the convolution operation may be rounded. For this case, the determination of the position of the line sync pulse from the zero of the first derivative can be made dependent on whether the gradient in the transition region of the result function is greater or less than a predetermined minimal or maximal value. If not, it is alternatively possible to place a staircase function through the transition region and establish the point of intersection between staircase function and derivative function and determine the position in this way. Otherwise, it is advantageous to carry out a linear regression in the transition region of the first derivative of the result function and establish the point of intersection between the regression line and the abscissa of the coordinate system. In this way, the minimum of the first derivative is calculated with subpixel resolution, which is also advantageous for the subsequent vertical filtering. Calculation with subpixel resolution is recommendable since the subsequent vertical filtering cannot effectively eliminate pixel quantization.

The linear or non-linear estimation of the position of the line sync pulses is carried out with a knowledge base (memory) which consists of the positions of a number of preceding line sync pulses. In this case, the number of line sync pulse positions used for the linear or non-linear estimation may be selected in a variable manner. The selection of 25 preceding positions corresponds approximately to the time constant of the PLL filtering as used for the standard video signals which are customary in Europe. If only 10 line sync pulse positions are used as the knowledge base, then that corresponds during the linear estimation by means of linear regression approximately to the time constant of the PLL filtering for the non-standard video signals which are customary in Europe.

As already mentioned, a linear regression can be carried out for the linear estimation. This computation method is particularly simple with regard to the computation outlay and can easily be programmed.

A very advantageous method additionally consists in establishing, in each case before the linear estimation is carried out, whether an abrupt sudden change has occurred in the positions of the line sync pulses which have been found, and, if so, switching off the knowledge base of the linear or non-linear estimation or changing it over to a different range. This measure is particularly advantageous when the source signal processed is the signal of an analogue video recorder which is operating in a trick mode (search mode). The effect that can be achieved in the ideal case by the abrupt changeover of the knowledge base of the linear regression to a new phase angle is that no disturbed video lines are visible in the picture. Thus, the picture is then extremely stable even in the search mode.

The advantageous measures in claims 10–13 are specified for an apparatus for carrying out the method.

BRIEF DESCRIPTION OF THE DRAWINGS

Exemplary embodiments of the invention are illustrated in the drawings and are explained in more detail in the following description. In the figures:

FIG. 3 shows a diagrammatic illustration of a convolution operation of two square-wave pulses;

FIG. 4 shows the structure of an MTA filter (moving time average) for carrying out the convolution operation;

FIG. 5 shows a diagrammatic illustration for the calculation of the zero of the first derivative of the result function of the convolution operation according to the invention;

DESCRIPTION OF THE PREFERRED EMBODIMENTS

Figure 1:
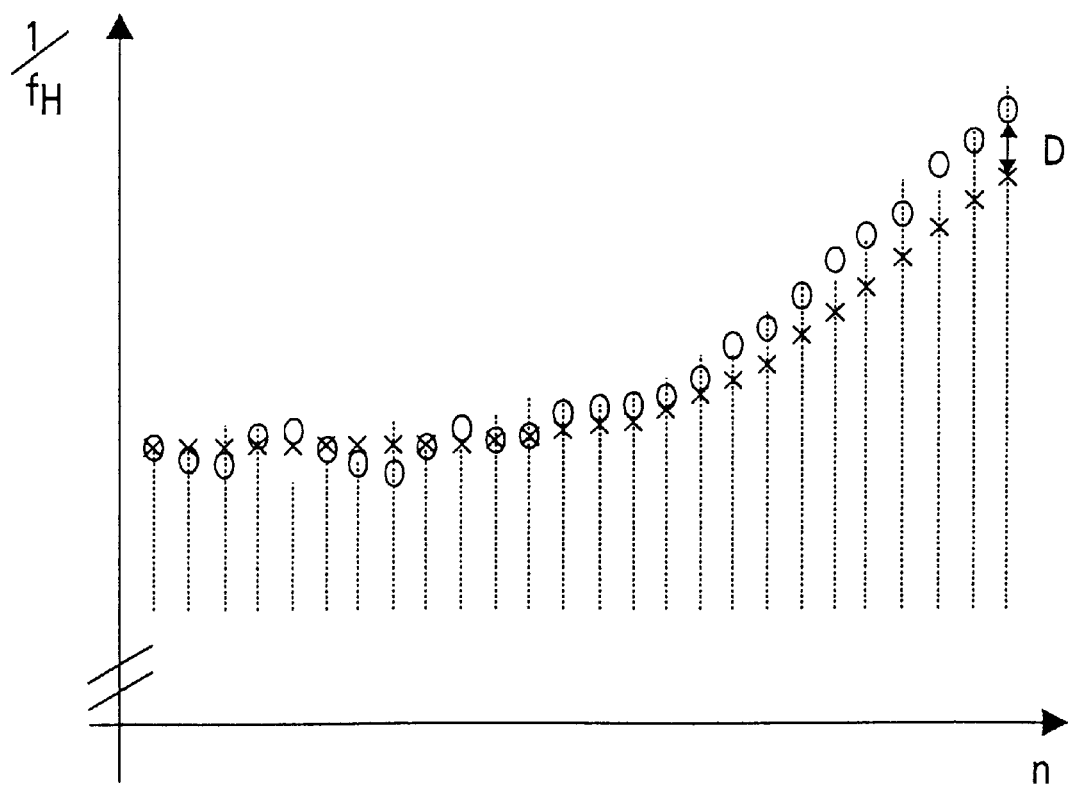
FIG. 1 shows simulated results for the reciprocal of the current horizontal frequency of line sync pulses in a video signal which has been picked off from a camcorder.

Simulated values for the position of the line sync pulses in a video signal are plotted in FIG. 1. The number of the respective line is plotted in the direction of the abscissa in FIG. 1. The reciprocal of the current horizontal frequency $1/f_H$ for the line sync pulses is plotted in the direction of the ordinate of FIG. 1. The line number of each video line is generally designated by the letter n. The plotting of the reciprocal of the current horizontal frequency means that the time-domain positions of the respective line sync pulses can be compared with one another. The values corresponding to the actual measured values for the individual positions of the line sync pulses are in each case specified by the broken vertical lines. The end of each broken vertical line then specifies the line sync pulse position established. If the video signal present were ideal, then all of the broken lines would have the same length. The illustration is made for a video signal generated by a camcorder. Fluctuations in the line sync pulse positions about an average value are clearly discernible in a first region of FIG. 1. A steady increase in the line sync pulse positions can be discerned in a second part of FIG. 1. This behaviour can be explained by the regulation of the speed of rotation of the head-drum, this regulation being slow to start. Component tolerances and noise may be responsible for the variations of the line sync pulses about an average value. The crosses in FIG. 1 specify the line sync pulse positions corrected by the PLL circuits which are usually used in the television receivers. However, the regulating behaviour of this PLL circuit results in the outputting of a phase error with regard to the line sync pulse positions as long as the vertical frequency in the video signal steadily changes. This is clearly discernible in the second part of FIG. 1 from the difference between the crosses and the broken lines. Since the sign of this phase error may be randomly distributed in the individual subpictures and, in addition, the value of the phase error likewise does not always remain constant, the phase deviation D is manifested as a visible disturbance in the video picture displayed. The disturbance corresponds to a horizontal jitter effect in large parts of the picture. The picture gives the impression that somebody is shaking it in the horizontal direction. In order to eliminate the phase error with frequency changes occurring in the video signal, it is customary in the case of an analogue PLL control loop to increase the bandwidth of the PLL circuit. If this measure is taken, then the line sync pulse positions which are indicated by circles in FIG. 1 are produced. However, this solution has the disadvantage that the noise suppression of the PLL circuit is impaired, as a result of which momentary picture disturbances in the form of a jitter behaviour are still discernible. Vertical lines no longer appear straight but rather distorted.

Figure 2:
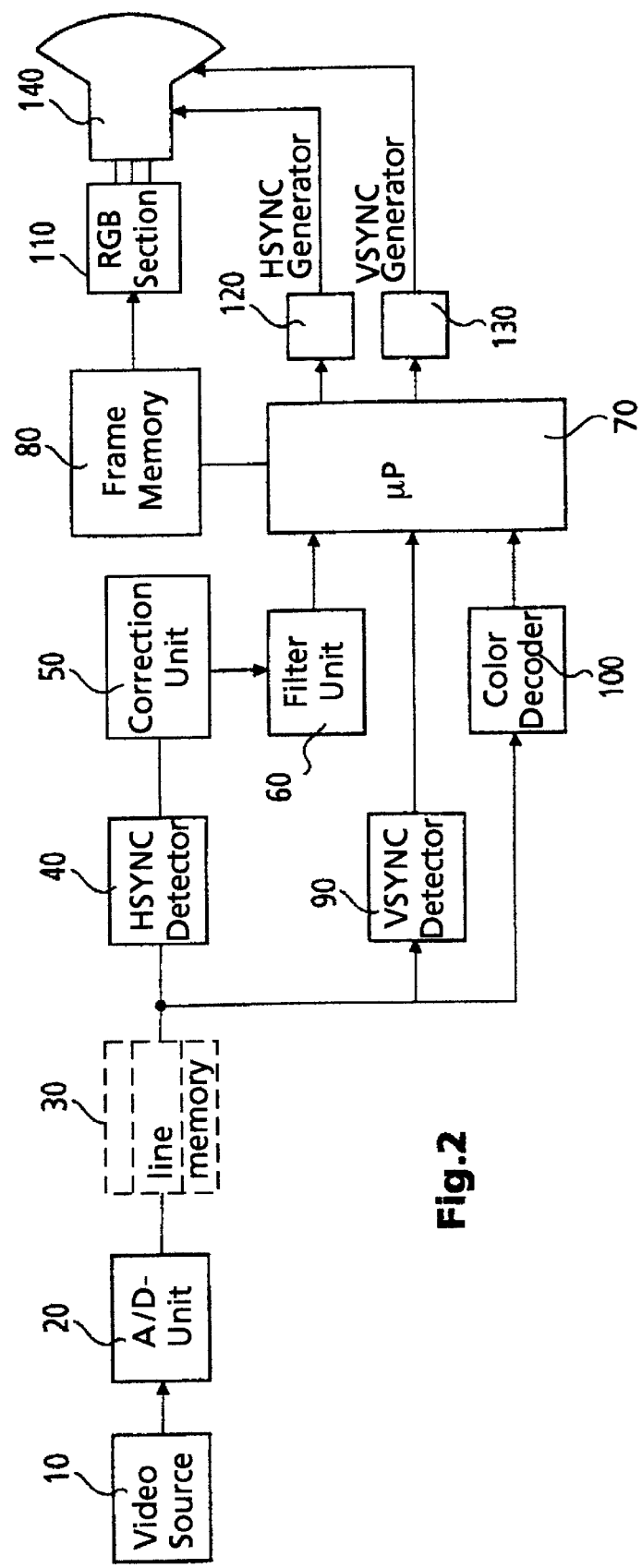
FIG. 2 shows a block diagram of the inventive apparatus for obtaining synchronization information items in the case of a video signal.

The entire system according to the invention is illustrated in FIG. 2. The reference numeral 10 designates an analogue source which supplies either standard video signals or non-standard video signals. The video signals are analogue CVBS signals. The analogue CVBS signal is fed to an A/D conversion unit 20. A fixed, free-running system clock is used for the digitization. The reference numeral 30 designates optional line stores. These may be present in order to ensure that even in the case of video signals generated by video recorders which are in a search mode, it is possible to display TV pictures without picture disturbances. As is known, the line stores serve virtually as buffers, so that more time is available to the internal signal processing before new values have to be entered into a frame store. The synchronization information items in the digitized video signal are obtained digitally by the signal processing stages 40, 50, 60 and 90. In detail, the reference numeral 40 designates a separator stage for the line sync pulses (HSYNC detector). The reference numeral 50 designates a correction unit which carries out adaptive correction for the line sync pulse positions obtained after sudden phase changes and interference that have been identified. The reference numeral 60 designates a filter unit which performs time-domain filtering of the detected line sync pulse position (HSYNC filter). The reference numeral 90 designates a separator stage for the vertical sync pulses (VSYNC detector). The information regarding which field of a video frame is currently being processed is also obtained in this unit. The modules 40, 50 and 60, which are essential to the invention, will be discussed in detail in each case below. The reference numeral 100 designates a colour decoder circuit. A YUV signal is picked off from the output of the colour decoder circuit 100. The reference numeral 70 designates a processor unit in which, in particular, interpolation calculations for the individual video lines are carried out in order to correct the frame signal in accordance with the synchronization information items obtained. This correction is down to the fact that due to the sampling of the video signal at a fixed sampling frequency, video lines of different lengths are produced on account of the different positions of the lines sync pulses, which video lines subsequently have to be aligned exactly one above the other and, if appropriate, be expanded or compressed, so that, in the picture displayed, ultimately all the video lines have the same length again and are not displayed in a manner displaced relative to one another. The samples corrected in this way are transferred to the frame store unit 80. The frame located in the frame store 80 can then be processed even further in subsequent signal processing stages. 50/100 Hz conversion is mentioned as an example. According to FIG. 2, the stored video data are additionally converted into RGB data and, finally, converted back into analogue RGB signals via a D/A converter, which is indicated by the circuit bearing the reference numeral 110. The RGB signals are then forwarded to the picture tube 140. The line synchronization information is processed in the circuit 120, which is connected to the processor unit 70. Horizontal deflection pulses for the picture tube 140 are generated on the basis of the data communicated from the processor unit 70. The circuits required for this purpose are sufficiently known to the relevant person skilled in the art, however, and need not be explained in any further detail here. The vertical synchronization information is correspondingly processed in the circuit 130. The circuit 130 likewise receives the vertical synchronization information from the processor unit 70 and generates the requisite vertical deflection voltages for the picture tube 140. The outputting of the data for a video line is controlled by the processor unit 70 via a corresponding clock. The data are then read from the frame store 80 in synchronism with the horizontal and vertical deflection voltages generated by the deflection units 120 and 130, respectively.

The functioning of the HSYNC detector 40 is discussed in more detail below. In contrast to the otherwise widespread edge detection for the falling edge of a line sync pulse in the CVBS signal, the HSYNC detector according to the invention operates according to the correlation principle. In this case, the CVBS signal is convolved with an ideal line sync pulse and then the minimum is sought. This principle is illustrated in FIG. 3, where it is possible to discern in principle that the convolution operation of two square-wave pulses generates a triangle function as result function. This function then has a minimum or maximum, which specifies the position of the line sync pulse. The CVBS signal for a video line is designated by the reference symbol $s_{in}(k)$. The reference symbol $s_{ideal}(k)$ designates an ideal line sync pulse. The result function of the convolution operation is designated by the reference symbol $\phi_{sv}(k)$. The reference symbol $k_s$ specifies the position of the minimum of the result function. The convolution operation is carried out in the HSYNC detector 40 for example in such a way that the CVBS signal present in one of the line stores 30 for a video line is digitally convolved with a corresponding ideal line sync pulse. The execution may alternatively be configured in such a way that instead of the CVBS signal for the entire video line being convolved with the ideal line sync pulse, only the relevant part for the line sync pulse is convolved with the idealized line sync pulse.

This detection method behaves extremely robustly even for example in the case of terrestrial signals with multipath propagation which are subjected to a great deal of interference. If a constant correlation length $l_s$ is used for the convolution operation, the MTA (Moving Time Average) filter known from the prior art is suitable, for example for the circuitry realization of the convolution operation, the structure of which filter is illustrated in FIG. 4, where the line sync pulse is represented in an idealized manner with a square-wave pulse response.

In order to determine the maximum or minimum in the result function of the convolution operation, the zero of the first derivative of the result function is calculated. This computation operation is illustrated in more detail in FIG. 5, where the reference symbol $\varphi_{SV}(k)$ designates the first derivative of the result function, the variable k stands for the respective sample of the derivative function, $k_s$ specifies the position of the zero of the derivative and $k_o$ specifies the last sample with a negative sign in the transition region of the first derivative of the result function. For an exact determination of the zero, a linear regression is carried out in the transition region of the derivative function. The zero is then calculated in a simple manner using the regression line established. The point of intersection of the regression line with the zero axis is designated by the reference symbol $N_s$ in FIG. 5. The regression length $l_v$ amounts to nine samples in the example illustrated. In this way, the minimum of the first derivative is calculated with subpixel resolution. The subpixel resolution is necessary since the subsequent vertical filtering cannot effectively eliminate pixel quantization. The subpixel resolution is also necessary because, e.g. given a sampling rate of 18 MHz for the A/D conversion in the A/D conversion unit 20 and a display having a width of 56 cm, the visibility limit for picture details is approximately 0.17 pixel. Investigations with various input signals have shown that a linear regression yields an optimum result for the calculation of the subpixel resolution. For the calculation of the centre of the line sync pulse, which corresponds to the minimum of the result function of the convolution operation, approximately 10 samples are sufficient for the region around the zero of the derivative function. The computation rule that approximately 10 samples are sufficient was established at a sampling rate of 18 MHz using video signals having a constant horizontal frequency for various signal-to-noise ratios in the case of terrestrial reception. In this case, the standard deviation for a signal having a signal-to-noise ratio of 15 dB was 0.93 pixel. In the case of a low-noise signal having a signal-to-noise ratio of 35 dB, the standard deviation is 0.07 pixel.

If video signals originating from video recorders are processed, the horizontal frequency can deviate by up to 4% in the trick mode in video recorders, which also proportionally affects the length of the line sync pulse. This is then manifested in a deterioration in the identifiability of the edge in the course of the derivative function of the result function of the convolution operation. However, it has been shown that deviations up to this degree have no relevant influence on the detection accuracy in the course of the zero determination. For the calculation of the centre $k_s$ of the line sync pulse by means of linear regression, it is possible to use an arithmetic unit instead of a more complex microprocessor, since approximately 32 μs remain for this calculation, which corresponds to half of one video line in the PAL system. Moreover, the equidistant samples enable a distinct simplification of the calculation. The formula for the calculation of the centre $k_s$ of the line sync pulse with subpixel accuracy then reads as follows:

$$k_s = k_0 - k_l \frac{\sum_{i=1}^{l} \varphi_{SV}\left(i - \frac{l}{2}\right)}{\sum_{i=1}^{l}\left(\left(i - \frac{l}{2}\right) \cdot \varphi_{SV}\left(i - \frac{l}{2}\right)\right)}$$

In this case, $k_l$ is a constant which can be calculated as a function of the regression length l. All the other symbols are known from the description regarding FIGS. 5 and 3.

Figure 6:
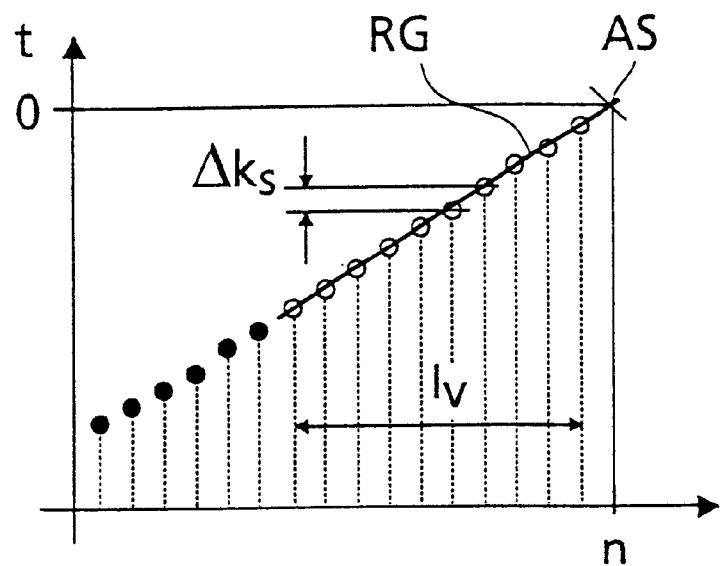
FIG. 6 shows a graphical illustration for the filtering of the established time-domain positions of the line synchronization pulses by means of linear regression.

The functioning of the filter device 60 is discussed in more detail below. The stability problems of vertical filtering by means of the customary PLL circuits are closely connected with the infinite memory of the feedback filter structure. The stability behaviour can be distinctly improved by vertical filtering with a linear estimation and a finite memory. This is shown particularly clearly in the reproduction operating mode of camcorders, which generate video signals having a rapidly fluctuating horizontal frequency on account of the compact mechanical system. PLL filtering produces a horizontally shaking picture in the case of this type of signal. According to the invention, vertical filtering with linear regression is carried out instead. In doing this, the line synchronization item that is currently to be output is then a linearly approximated estimate based on the passed detected line sync pulse positions for the instant $k_s(n)$. This linear estimation is illustrated in more detail in FIG. 6. The numbers n of the respective video lines are plotted in the direction of the abscissa. The instants at which the line sync pulse appears for the respective lines are plotted in the direction of the ordinate. The time difference between two neighbouring line sync pulses is designated by the symbol $\Delta k_s$. The reference symbol $l_v$ specifies the regression length for the linear regression. The reference symbol RG designates the regression line. The reference symbol AS specifies the current estimate from the regression calculation. In principle, the regression length $l_v$ corresponds to the time constant in the case of customary PLL filtering and therefore influences the suppression of noise in the case of noisy signals. Regression lengths of 25 and 10 correspond approximately to the time constants of the systems for standard and non-standard video signals which are customary in Europe (antennas and SCART input). A regression length of 10 samples has been chosen in FIG. 6. The requisite computation operations for the linear regression are sufficiently known to the relevant person skilled in the art and need not be explained in any further detail here.

Figure 7:
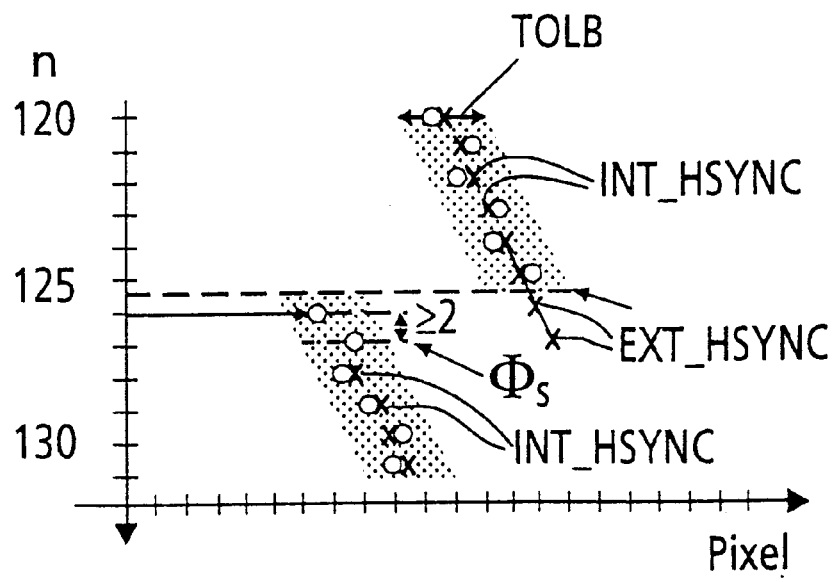
FIG. 7 shows a diagrammatic illustration for the inventive sudden phase change identification for the inventive adaptive vertical filtering of the positions of the line synchronization pulses.

The functioning of the HSYNC correction unit 50 is explained in more detail below. As already explained, in video signals generated by analogue video recorders which are operating in a trick mode, sudden phase changes arise in the horizontal frequency as a result of the track changes of the video heads. These sudden phase changes lead to the known, unattractive transient response of the analogue PLL or its digital realization in the case of digital processing. The invention provides adaptation of the horizontal signal filtering in the event of sudden phase changes or in the event of other interference, which results in distinctly improved reproduction. This is achieved by the abrupt changeover to a new phase angle. In the ideal case, no disturbed lines will then be visible any longer and the picture is extremely stable. FIG. 7 illustrates the principle for identification of a sudden phase change. In FIG. 7, the respective pixel position in a video line is specified in the direction of the abscissa. A constant number of pixels per line is always assumed. There are 1152 pixels per line given an 18 MHz system clock. The respective video line number is plotted in the direction of the ordinate. The circles in FIG. 7 designate the established line sync pulse positions of the respective line. It is clearly evident that the line sync pulse positions are, on the one hand, subjected to fluctuations and, on the other hand, subject to a steady frequency change on account of the regulation of the head-drum rotation of the video recorder. In the middle region of FIG. 7, a sudden phase change can be discerned, which is produced on account of a head changeover in the event of a track change in the search mode. The crosses in FIG. 7 represent the interpolated estimates on the basis of the linear regression of the measured line sync pulse positions. The tolerance zone TOLB serves as the first detection criterion for identification of a sudden phase change. If a line sync pulse position has been measured which lies outside the previously calculated tolerance zone TOLB, then a sudden phase change may be present. To that end, a check is then additionally made to see whether a newly calculated tolerance zone is complied with for the next two or more measured line sync pulse positions. If that was the case, a sudden phase change has been identified. This is the case, therefore, for the video line bearing the reference symbol $\phi_s$. The new line sync pulse positions are then calculated no longer on the basis of the measured line sync pulse positions for the lines 120–125 but instead on the basis of the measured line sync pulse positions for the lines 126–128, etc. Thus, after the identification of a sudden phase change, the memory of the linear regression is switched off and a new memory is slowly accumulated.

If the display used is a cathode ray tube, as illustrated in FIG. 2, it is necessary to compensate for the sudden phase change adaptation by means of a buffer memory, because the horizontal deflection electronics must not be burdened by abrupt sudden frequency changes, in order to protect them. The use of the frame store in the exemplary embodiment according to FIG. 2 fulfils this requirement. In order to protect the horizontal deflection electronics for cathode ray tubes, new sync pulses must nevertheless be immediately output again after a sudden phase change or in the event of missing sync pulses. This is done for example by outputting estimates which have been calculated still on the basis of the old knowledge base (memory) for the linear regression. These estimates are designated by the reference symbols EXT_HSYNC in FIG. 7.

For the protection of the horizontal deflection electronics, it is possible to use for example the following output behaviour for the outputting of line sync pulses. If $T_h$ is the standard line duration of the video line, a detected line sync pulse is ignored if it already occurs in the first half of the video line after an output HSYNC pulse. The next HSYNC pulse is output on the basis of a detected line sync pulse in a manner corresponding to the filtered value, if the detected line sync pulse occurs in the time limit $½ T_h < \Delta k_s \leq 1½ T_h$. However, if a further line sync pulse has still not occurred even after the time $1½ T_h$ has elapsed, an estimated HSYNC pulse is compulsorily output in order to protect the horizontal deflection electronics and to avoid vertical offsets of the two fields.

Figure 8:
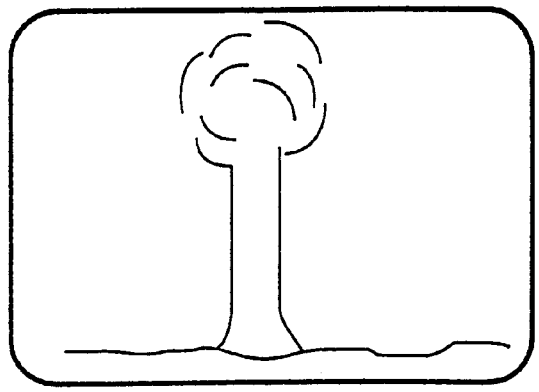
FIG. 8a shows an undisturbed TV picture.
FIG. 8b shows a TV picture which is disturbed by PLL filtering on account of head changeovers in a video recorder, the video recorder playing with a doubled forward search speed.
FIG. 8c shows a TV picture which is likewise generated by a video recorder playing with a doubled search speed and has been corrected by the method according to the invention.
Figure 8:
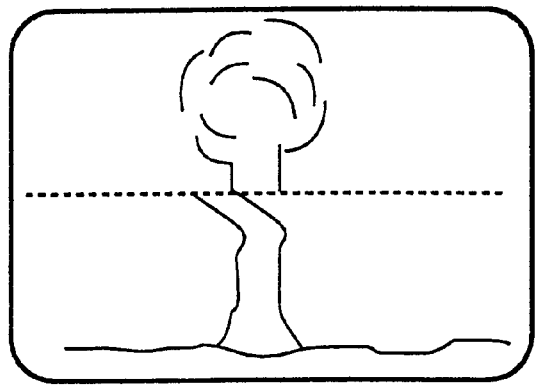
Figure 8:
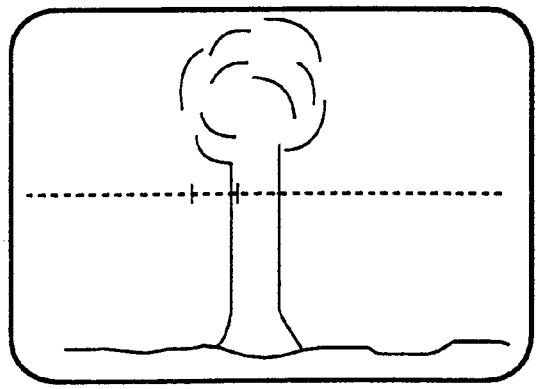

In the case of the principle presented, the picture quality in such video recorder trick modes depends on the hardware outlay. In the exemplary embodiment according to FIG. 2, approximately 2 video line periods are already available for identification of a sudden phase change on account of the latency of the colour decoder 100, this resulting in approximately one disturbed video line. If the line stores 30 illustrated as an option are also used instead, then it is possible to output a completely corrected picture in which no disturbances can be discerned. This is also illustrated in FIG. 8. The undisturbed video frame is illustrated in FIG. 8*a*. FIG. 8*b* shows the customary picture disturbances in the case of a fast forward run mode with a doubled speed if the known PLL filtering is used. FIG. 8C, on the other hand, shows the picture that is displayed if the method according to the invention is used and no additional line stores are used. In that case only two video lines are disturbed.

The vertical signal processing in the VSYNC detector circuit 90 remains virtually unchanged from the known methods. In order to detect the vertical sync pulses, a single binary signal is first of all generated with the synchronization threshold. This signal controls an up/down counter whose counter reading detects the vertical sync pulse, on the one hand. On the other hand, the field number is determined from the time difference between current VSYNC pulse and last HSYNC pulse.

This solution produces good vertical synchronization without a field offset even during critical changeover processes between different trick modes of the video recorder with a changing number of lines per field.

Figure 9:
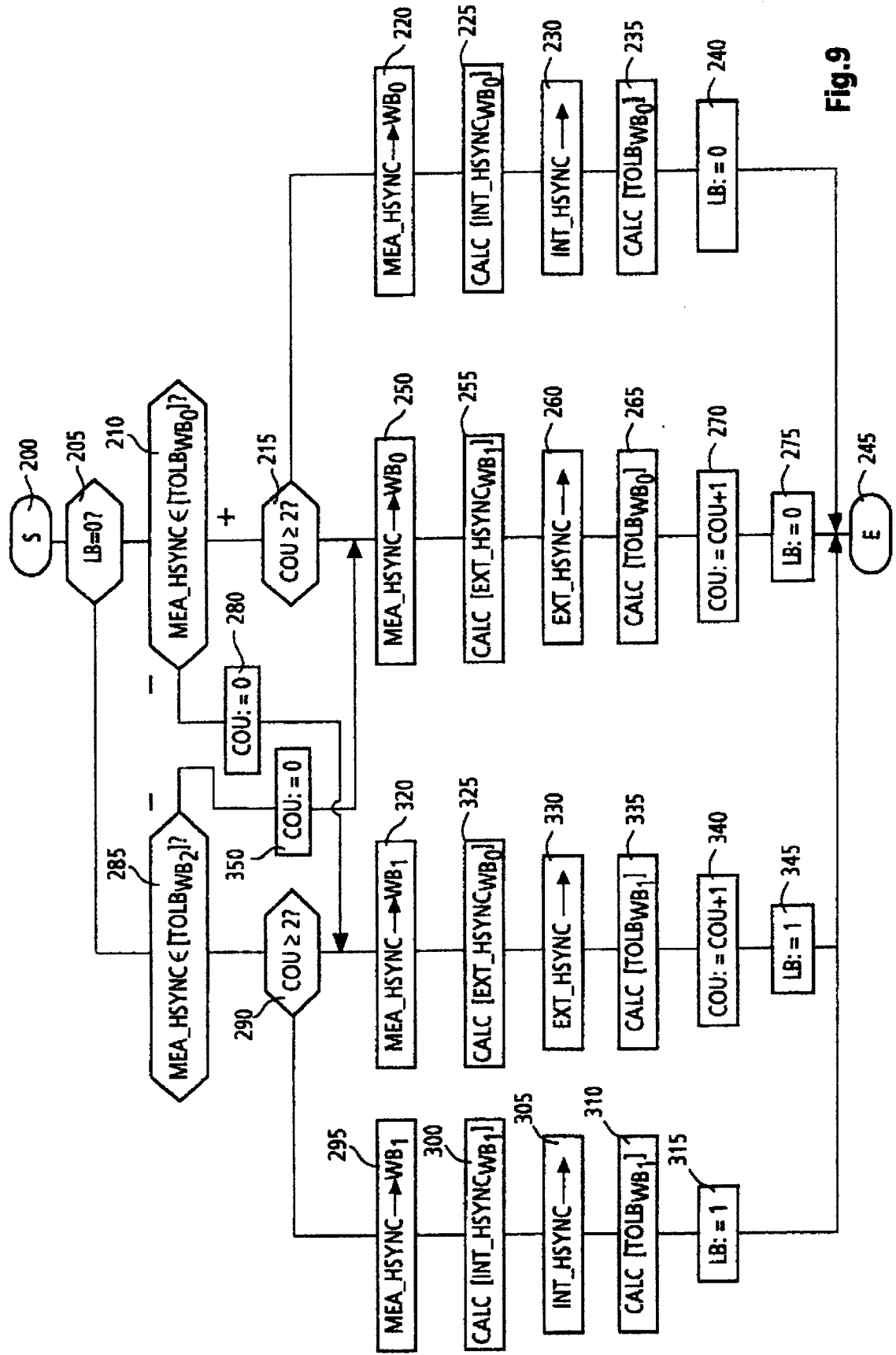
FIG. 9 shows a structogram for a computer program which is designed to identify sudden phase changes in the video signal and carry out the vertical filtering in a correspondingly adaptive manner.

A superordinate programme for the identification of a sudden phase change is illustrated in FIG. 9. The programme is processed by the correction unit 50 each time a line synchronization pulse has been newly measured. The reference numeral 200 designates the programme start. In interrogation 205, a check is made to see whether a label has assumed a value 1. If that is the case, then a check is made in the subsequent interrogation 210 to see whether the measured line sync pulse position lies within the tolerance zone for the current knowledge base $WB_0$. If that is the case, a check is made in the subsequent interrogation 215 to see whether a counter has assumed the value 2 or a larger value. If that is the case, the measured line sync pulse position is fed to the current knowledge base $WB_0$ in the programme step 220. If appropriate, an older value from the current knowledge base $WB_0$ is also [lacuna] here. Afterwards, in programme step 225, an interpolated estimate is calculated by means of the linear regression for the HSYNC pulse to be output. The calculation is carried out on the basis of the current knowledge base $WB_0$. In programme step 230, the interpolated estimate is output, that is to say made available in the store for later outputting. In programme step 235, the calculation of the new tolerance interval for the current knowledge base $WB_0$ then takes place. Finally, the label is additionally set to the value 0 in programme step 240. The programme is then ended in programme step 245. Let it be assumed that during a subsequent processing of the programme, it is identified in interrogation 210 that the measured line sync pulse no longer lies within the tolerance zone of the current knowledge base $WB_0$. The counter COU is then set to the value 0 in programme step 280. Subsequently, the currently measured line sync pulse position is entered into a new knowledge base $WB_1$ in programme step 320. Afterwards, in programme step 325, an extrapolated estimate is calculated for the current video line, which estimate, however, is calculated still based on the old knowledge base $WB_0$. This calculated value is output in programme step 330, that is to say made available for outputting in the store. Subsequently, a tolerance zone for the new knowledge base $WB_1$ is then calculated in programme step 335. The counter COU is then incremented in programme step 340. The label is reset to the value 1 in programme step 345. During subsequent processing of the programme, a check is then made in interrogation 285 to see whether the newly measured line sync pulse lies within the newly calculated tolerance zone for the knowledge base $WB_1$. If that is the case, a check is made in interrogation 290 to see whether the counter COU has already reached the counter reading 2. Let it be assumed that this is not yet the case at this point in time. In that case, programme steps 320 to 345 are processed again and the programme is ended in programme step 245. In the next programme run, let it be assumed that the counter COU has already reached the value 2 in programme step 290. In this case, the measured line sync pulse position is likewise entered into the new knowledge base $WB_1$ in programme step 295. Subsequently, in programme step 300, the calculation of an interpolated estimate for the HSYNC pulses to be newly output takes place. The interpolation is now effected on the basis of the new knowledge base $WB_1$. The interpolated estimate is output in programme step 305. The new tolerance zone for the knowledge base $WB_1$ is calculated in programme step 310. After this programme step has been executed, the label is set to the value 1 in programme step 315. The programme is also ended thereafter in programme step 245. Let it now be assumed that in the event of a subsequent programme run, it is identified in interrogation 285 that the measured line sync pulse position lies outside the tolerance zone of the knowledge base $WB_1$. The counter COU is then reset to the value 0 in programme step 350. In programme step 250, the measured line sync pulse is then entered into the knowledge base $WB_0$, which is new in this case. In an analogous manner to programme steps 325 to 340, the calculation of an extrapolated value for the HSYNC pulse to be output and also the calculation of the new tolerance zone for the knowledge base $WB_0$ take place in programme steps 255 to 270. The counter is incremented again in programme step 270 and the label is set to the value 1 in programme step 275. The programme is then likewise ended once again in programme step 245. It should also be mentioned that in programme steps 320 and 250, where a new knowledge base is accumulated again in each case, an older knowledge base that is no longer required can be overwritten. The calculation of the interpolated and also of the extrapolated line sync pulse positions in programme steps 300, 325, 255 and 225 is advantageously realized as a subroutine which is processed in the filter device 60.

Figure 10:
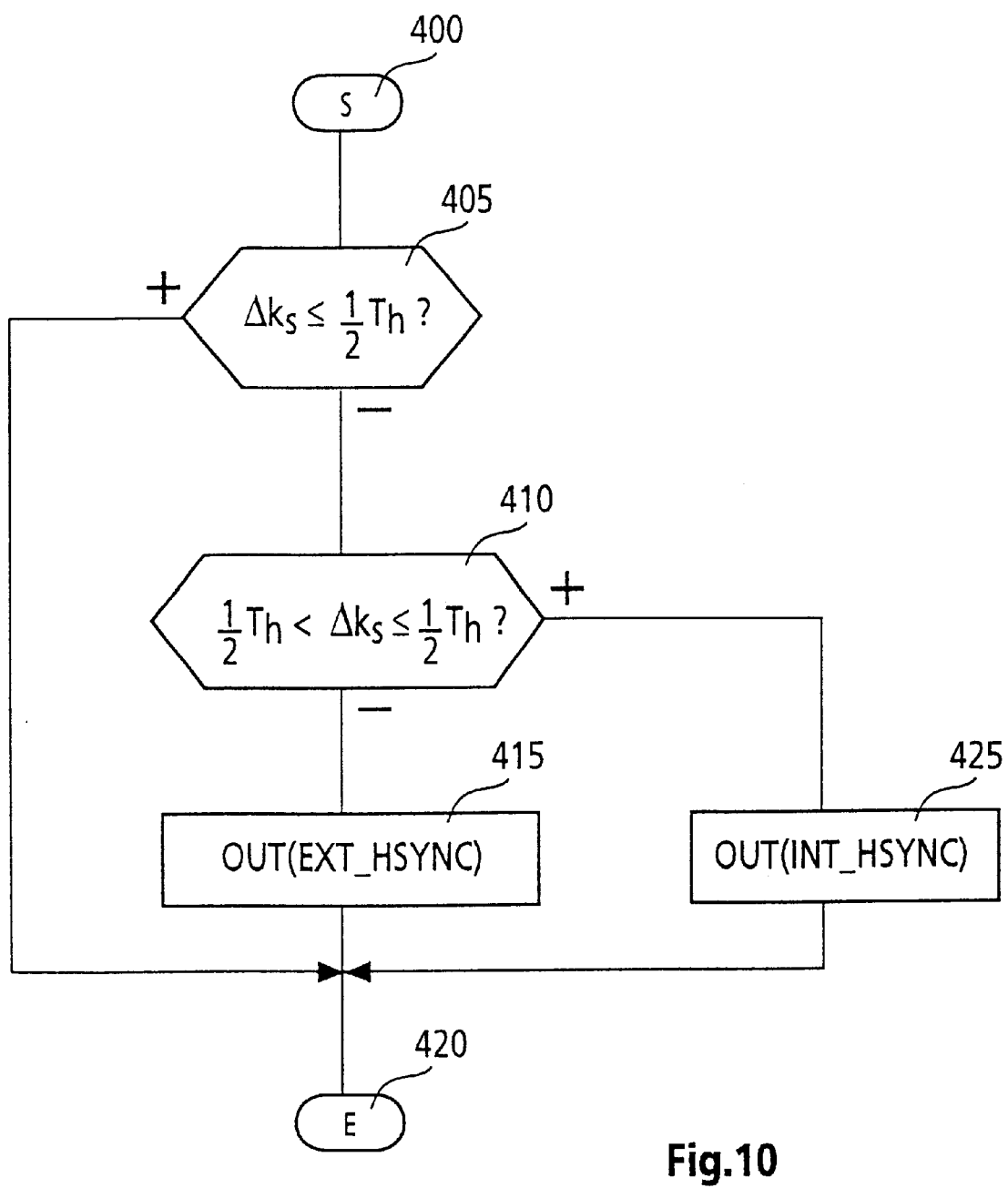
FIG. 10 shows a structogram for a computer program for outputting missing horizontal sync pulses and also for suppressing incorrectly identified horizontal sync pulses.

Finally, a structogram for a programme for suppressing incorrectly identified horizontal pulses and/or for generating omitted horizontal pulses is also described. In FIG. 10, the reference numeral 400 designates the programme start. A check is made in interrogation 405 to see whether a line sync pulse has also been identified within half the line duration of a video line. If so, the programme is ended with programme step 420 and this identified line sync pulse is suppressed but if a negative result is obtained in interrogation 405, a check is made in interrogation 410 to see whether a line synchronization pulse has occurred in the time after the first half of the line duration up to the end of the first half of the next line duration. If that is the case, then in programme step 425 the associated interpolated HSYNC pulse is released for generation. Afterwards the programme is likewise ended in programme step 420. If this interrogation 410 was not fulfilled either, then an extrapolated value for the outputting of an HSYNC pulse is output and enabled for generation. Afterwards the programme is likewise ended in programme step 420. The programme that has been explained is preferably processed in the processor unit 70.

Manifold modifications of the exemplary embodiments described are possible and are also regarded as lying within the scope of the invention. The principle that has been presented for defining the exact line sync pulse position can, if appropriate, also be employed together with conventional PLL filtering. Conversely, the inventive vertical filtering with linear estimation can also be employed in connection with the conventional determination of the line sync pulse position by way of the falling edge of the line sync pulse. However, the best results are obtained when both the improvement measures according to the invention are employed together. Of course, the invention can also be employed when a matrix display (such as e.g. LCD or plasma display) is used instead of a picture tube.

What is claimed is:

1. Method for obtaining line synchronization information items from a video signal, comprising the following method steps:

a) determining the position of a line synchronization pulse by convolving the video signal for the respective video line with a pattern function, and carrying out analysis of the result function of the convolution operation;

b) filtering the positions of line synchronization pulses in the temporal direction, wherein an estimation for the determination of a correction position of a line synchronization information item is carried out.

2. Method according to claim 1, in which an idealized line synchronization pulse is used as the pattern function.

3. Method according to claim 1, in which the analysis of the result function of the convolution operation comprises the step of determination of the maximum or minimum of the result function, the maximum or minimum indicating the position of the line synchronization pulse.

4. Method according to claim 3, comprising the step of forming the first derivative of the result function, and determining the zero of the first derivative, which then specifies the position of the maximum or minimum.

5. Method according to claim 4, in which the step of determining the zero of the first derivative comprises the step of carrying out a linear regression and determining the point of intersection between the regression line and the abscissa of the coordinate system.

6. Method according to claim 4, in which the determination of the maximum or minimum of the result function is made dependent on whether the first derivative has at the zero at least a gradient which is greater or less than a predetermined minimal or maximal value.

7. Method according to claim 1, in which the estimation is carried out with a knowledge base which consists of the positions of a number of preceding line synchronization pulses.

8. Method according to claim 1 in which the estimation comprises the step of forming a linear regression of the positions of the line synchronization pulses.

9. Method according to claim 7, comprising the step of establishing whether an abrupt sudden change has occurred in the case of the positions of the line synchronization pulses, and if so, switching off or changing to a different range the knowledge base of estimation during the time-domain filtering of the positions of the line synchronization pulses.

10. Apparatus for obtaining line synchronization information items from a video signal comprising the following components:

a) a line sync signal identification unit, in which the exact position of a line sync pulse is determined by convolution of the video signal for a video line with a pattern function and subsequent analysis of the result function of the convolution operation; and b) a filter device, in which the positions of the line synchronization pulses are filtered in the temporal direction, an estimation for a corrected position of a line synchronization pulse taking place.

11. Apparatus according to claim 10, having a sudden position change identification unit, in which it is determined whether an abrupt sudden change has occurred in the case of the specific positions of the line synchronization pulses, and which causes the filter device, after an identified sudden change, to switch off its knowledge base, for the estimation or change it over to a different range.

12. Apparatus according to claim 10, in which the line synchronization signal identification unit comprises an MTA filter (Moving Time Average filter) for the convolution operation.

13. Apparatus according to claim 11, in which the line synchronization signal identification unit comprises an MTA filter (Moving Time Average filter) for the convolution operation.

* * * * *